(12) United States Patent
Takada et al.

(10) Patent No.: US 10,353,394 B2
(45) Date of Patent: Jul. 16, 2019

(54) DRIVING ASSISTANCE DEVICE AND DRIVING ASSISTANCE METHOD

(71) Applicants: Toyota Jidosha Kabushiki Kaisha, Toyota-shi, Aichi-ken (JP); National University Corporation Nagoya University, Nagoya-shi, Aichi-ken (JP)

(72) Inventors: Hiroaki Takada, Nagoya (JP); Yousuke Watanabe, Nagoya (JP); Kentaro Takaki, Nagoya (JP); Takayuki Morikawa, Nagoya (JP); Yoshiki Ninomiya, Nagoya (JP); Shigeharu Teshima, Nagoya (JP)

(73) Assignees: Toyota Jidosha Kabushiki Kaisha, Toyota-shi (JP); National University Corporation Nagoya University, Nagoya-shi (JP)

( * ) Notice: Subject to any disclaimer, the term of this patent is extended or adjusted under 35 U.S.C. 154(b) by 53 days.

(21) Appl. No.: 15/671,852

(22) Filed: Aug. 8, 2017

(65) Prior Publication Data
US 2018/0046193 A1 Feb. 15, 2018

(30) Foreign Application Priority Data
Aug. 12, 2016 (JP) .................................. 2016-158947

(51) Int. Cl.
*G05D 1/00* (2006.01)
*G05D 1/02* (2006.01)
(Continued)

(52) U.S. Cl.
CPC .......... *G05D 1/0214* (2013.01); *B60W 30/08* (2013.01); *B60W 30/09* (2013.01); *B60W 30/095* (2013.01); *B60W 30/0953* (2013.01); *B60W 30/0956* (2013.01); *G05D 1/0011* (2013.01); *G05D 1/0055* (2013.01);
(Continued)

(58) Field of Classification Search
CPC .......... G05D 1/0214; G05D 1/0289; G05D 1/0223; G05D 1/0276; G05D 1/0055; G05D 1/0011; B60W 30/0953; B60W 30/095; B60W 30/08; B60W 30/0956;
(Continued)

(56) References Cited

U.S. PATENT DOCUMENTS 9,110,471 B2 * 8/2015 Pack et al. ........... G05D 1/0214
9,663,003 B2 * 5/2017 Bharwani .............. G08G 1/164
(Continued)

FOREIGN PATENT DOCUMENTS

JP 2014-016727 A 1/2014

*Primary Examiner* — Dale W Hilgendorf
(74) *Attorney, Agent, or Firm* — Dinsmore & Shohl LLP

(57) ABSTRACT

A driving assistance device includes a driving situation acquisition unit that acquires driving situations of vehicles that may collide with each other, a driving characteristics acquisition unit that acquires driving characteristics of drivers of the vehicles, a driving action determination unit that determines driving actions that allow the vehicles to avoid collision with each other in the driving situation acquired by the driving situation acquisition unit and that match the driving characteristics acquired by the driving characteristics acquisition unit, and a driving action instruction unit that instructs the vehicles about the driving actions determined by the driving action determination unit.

5 Claims, 19 Drawing Sheets

(51) Int. Cl.
  *G08G 1/16* (2006.01)
  *B60W 30/08* (2012.01)
  *B60W 30/09* (2012.01)
  *B60W 30/095* (2012.01)
  *B60W 50/00* (2006.01)
  *B60W 50/14* (2012.01)

(52) U.S. Cl.
  CPC ......... *G05D 1/0223* (2013.01); *G05D 1/0276* (2013.01); *G05D 1/0289* (2013.01); *G08G 1/161* (2013.01); *G08G 1/163* (2013.01); *G08G 1/164* (2013.01); *G08G 1/166* (2013.01); *B60W 50/0097* (2013.01); *B60W 50/14* (2013.01); *B60W 2050/0027* (2013.01); *B60W 2540/30* (2013.01); *B60W 2550/10* (2013.01); *B60W 2550/14* (2013.01); *B60W 2550/22* (2013.01); *B60W 2550/40* (2013.01); *B60W 2750/40* (2013.01)

(58) Field of Classification Search
  CPC ....... B60W 30/09; G08G 1/163; G08G 1/164; G08G 1/161; G08G 1/166
  See application file for complete search history.

(56) References Cited

U.S. PATENT DOCUMENTS

| | | | |
|---|---|---|---|
| 9,663,033 B2* | 5/2017 | Bharwani | G08G 1/164 |
| 9,932,033 B2* | 4/2018 | Slusar et al. | B60W 30/09 |
| 2007/0193798 A1* | 8/2007 | Allard et al. | B60W 30/095 180/169 |
| 2007/0225882 A1* | 9/2007 | Yamaguchi et al. | B60W 30/095 701/36 |
| 2011/0077028 A1* | 3/2011 | Wilkes, III et al. | B60W 30/08 455/456.3 |
| 2011/0082623 A1* | 4/2011 | Lu et al. | G08G 1/166 701/41 |
| 2011/0190972 A1* | 8/2011 | Timmons et al. | G08G 1/166 701/31.4 |
| 2017/0088142 A1* | 3/2017 | Hunt et al. | B60W 30/08 |
| 2017/0166124 A1* | 6/2017 | Nakagawa et al. | G08G 1/163 |
| 2018/0074497 A1* | 3/2018 | Tsuji et al. | G05D 1/0223 |

* cited by examiner

|  | ACCELERATION | DECELERATION | STOPPING | LANE CHANGING | WATCHING FOR CROSS TRAFFIC | |
|---|---|---|---|---|---|---|
| DRIVER 1a | 3 | 5 | 4 | 6 | 6 | ... |
| DRIVER 2a | 5 | 5 | 2 | 6 | 4 | ... |
| DRIVER 3a | 8 | 4 | 1 | 3 | 5 | ... |
| ⋮ | ⋮ | ⋮ | ⋮ | ⋮ | ⋮ | ⋮ |

FIG. 7

| COMBINATION OF DRIVING ACTIONS | SCORE |
|---|---|
| (ACCELERATION, DECELERATION) | 3 + 5 = 8 |
| (ACCELERATION, LANE CHANGING) | 3 + 6 = 9 |
| (DECELERATION, ACCELERATION) | 5 + 5 = 10 |
| (DECELERATION, LANE CHANGING) | 5 + 6 = 11 |
| (WATCHING FOR CROSS TRAFFIC, LANE CHANGING) | 6 + 6 = (12) |

MAXIMUM SCORE

FIG. 10

| COMBINATION OF DRIVING ACTIONS | SCORE |
|---|---|
| (ACCELERATION, DECELERATION) | 3 + 5 = 8 |
| (DECELERATION, ACCELERATION) | 5 + 5 = (10) |

MAXIMUM SCORE

FIG. 13

| COMBINATION OF DRIVING ACTIONS | SCORE |
|---|---|
| (ACCELERATION, DECELERATION, DECELERATION) | 3 + 5 + 4 = 12 |
| (DECELERATION, ACCELERATION, ACCELERATION) | 5 + 5 + 8 = (18) |

MAXIMUM SCORE

FIG. 16

| COMBINATION OF DRIVING ACTIONS | SCORE |
|---|---|
| (ACCELERATION, DECELERATION, DECELERATION) | 3 + 5 + 4 = 12 |
| (DECELERATION, ACCELERATION, DECELERATION) | 5 + 5 + 4 = ⑭ |

MAXIMUM SCORE

FIG. 19

| COMBINATION OF DRIVING ACTIONS | SCORE |
|---|---|
| (DECELERATION, DECELERATION, DECELERATION) | 5 + 5 + 4 = 14 |
| (DECELERATION, DECELERATION, ACCELERATION) | 5 + 5 + 8 = (18) |
| (DECELERATION, ACCELERATION, DECELERATION) | 5 + 5 + 4 = 14 |
| (DECELERATION, ACCELERATION, ACCELERATION) | 5 + 5 + 8 = (18) |
| (ACCELERATION, DECELERATION, DECELERATION) | 3 + 5 + 4 = 12 |
| (ACCELERATION, DECELERATION, ACCELERATION) | 3 + 5 + 8 = 16 |
| (ACCELERATION, ACCELERATION, DECELERATION) | 3 + 5 + 4 = 12 |
| (ACCELERATION, ACCELERATION, ACCELERATION) | 3 + 5 + 8 = 16 |

MAXIMUM SCORE

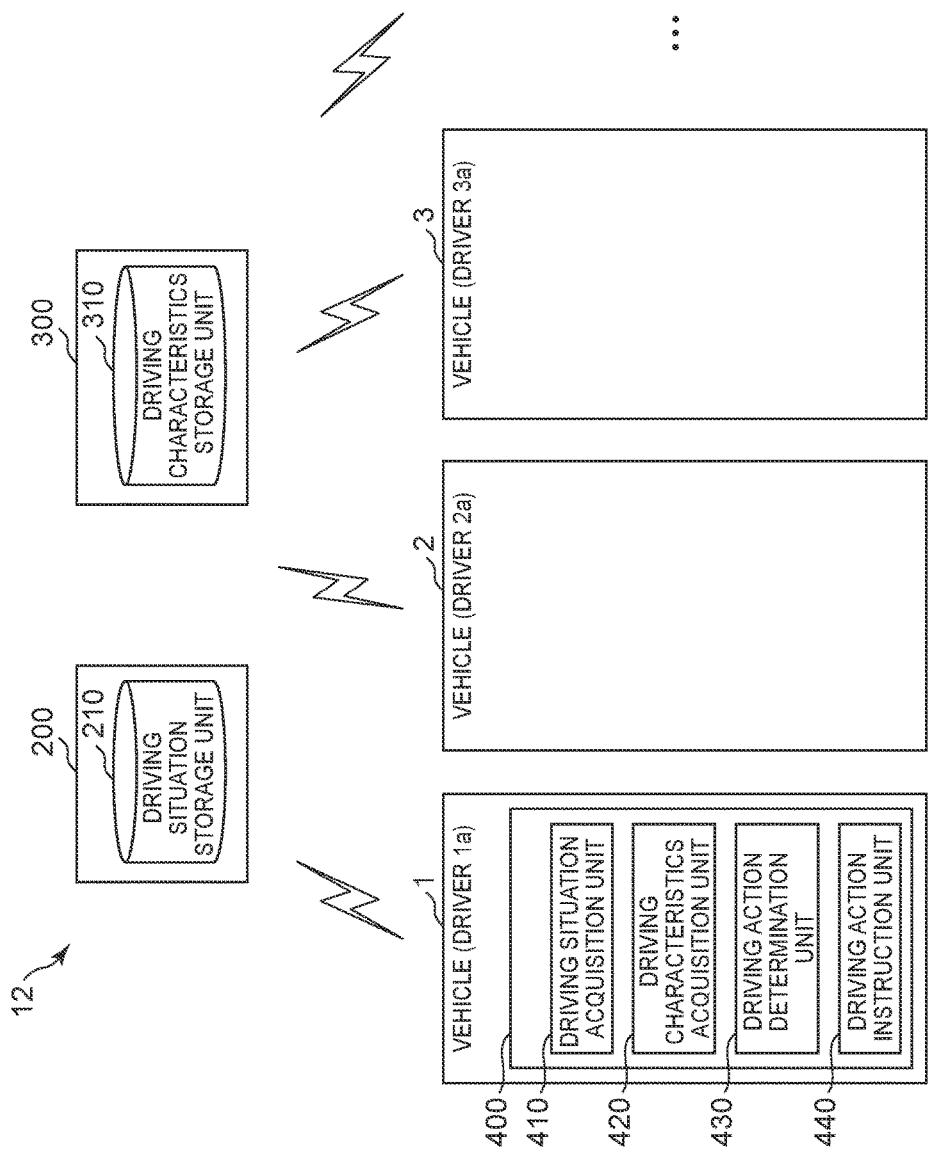

DRIVING ASSISTANCE DEVICE AND DRIVING ASSISTANCE METHOD

CROSS-REFERENCE TO RELATED APPLICATIONS

This application claims priority to Japanese Patent Application No. 2016-158947 filed on Aug. 12, 2016, incorporated herein by reference in its entirety.

BACKGROUND

1. Technical Field

The present disclosure relates to a driving assistance device and a driving assistance method.

2. Description of Related Art

Conventionally, there is known a driving assistance device that can provide appropriate driving assistance, suitable for the driving characteristics of the driver of a host vehicle, in order to avoid collision between the host vehicle and a moving object (for example, see Japanese Patent Application Publication No. 2014-16727 (JP 2014-16727 A)).

SUMMARY

When driving assistance is provided to avoid collision between the host vehicle and another vehicle, the content of driving assistance may change depending upon the driving characteristics of the driver of the other vehicle. However, in the conventional technology, the content of driving assistance is determined with consideration only for the driving characteristics of the driver of the host vehicle. This makes it difficult to provide appropriate driving assistance to the vehicles that may collide with each other.

Thus, one aspect of the present disclosure provides a device and a method for providing appropriate driving assistance to the vehicles that may collide with each other.

According to a first aspect of the present disclosure, there is provided a driving assistance device including a driving situation acquisition unit that acquires driving situations of vehicles that may collide with each other; a driving characteristics acquisition unit that acquires driving characteristics of drivers of the vehicles; a driving action determination unit that determines driving actions that allow the vehicles to avoid collision with each other in the driving situation acquired by the driving situation acquisition unit and that match the driving characteristics acquired by the driving characteristics acquisition unit; and a driving action instruction unit that instructs the vehicles about the driving actions determined by the driving action determination unit.

A driving assistance method according to a second aspect of the present disclosure includes: acquiring driving situations of vehicles that may collide with each other; acquiring driving characteristics of drivers of the vehicles; determining driving actions that allow the vehicles to avoid collision with each other in the acquired driving situation and that match the acquired driving characteristics; and instructing the vehicles about the determined driving actions.

A driving assistance device according to a third aspect of the present disclosure includes an electronic control device configured to: acquire first information about driving situations of vehicles that may collide with each other; acquire second information about driving characteristics of drivers of the vehicles; determine, based on the first information and the second information, driving actions that allow the vehicles to avoid collision with each other in the acquired driving situation and that match the acquired driving characteristics; and send the determined driving actions to the vehicles.

According to above aspects, the driving actions that allow the vehicles to avoid collision with each other can be determined by taking into consideration the driving characteristics of the drivers of the vehicles. The instructions, each indicating a driving action determined with the driving characteristics of each of the drivers of the vehicles taken into consideration in this manner, are sent to the vehicles and, therefore, appropriate driving assistance can be provided to the vehicles.

In the above aspect of the present disclosure, the driving action determination unit may generate a plurality of combinations of driving actions that allow the vehicles to avoid collision with each other in the driving situation acquired by the driving situation acquiring unit and, from among the plurality of generated combinations, select a combination that matches the driving characteristics acquired by the driving characteristics acquiring unit.

According to this aspect, since the number of variations of a combination of driving actions that allows the vehicles to avoid collision with each other increases, more appropriate driving actions that allow the vehicles to avoid collision with each other can be narrowed down from various options while taking the driving characteristics of the drivers into consideration.

According to one aspect of the present disclosure, appropriate driving assistance can be provided to the vehicles that may collide with each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a diagram showing an example of a method for selecting a combination that matches the driving characteristics of the drivers from the plurality of combinations generated in FIG. 6;

FIG. 10 is a diagram showing an example of a method for selecting a combination that matches the driving characteristics of the drivers from the plurality of combinations generated in FIG. 9;

FIG. 13 is a diagram showing an example of a method for selecting a combination that matches the driving characteristics of the drivers from the plurality of combinations generated in FIG. 12;

FIG. 16 is a diagram showing an example of a method for selecting a combination that matches the driving characteristics of the drivers from the plurality of combinations generated in FIG. 15;

FIG. 19 is a diagram showing an example of a method for selecting a combination that matches the driving characteristics of the drivers from the plurality of combinations generated in FIG. 18; and FIG. 20 is a diagram showing an example of a configuration of a driving assistance device according to a second embodiment.

DETAILED DESCRIPTION OF EMBODIMENTS

Embodiments of the present disclosure will be described in detail below.

First Embodiment

Figure 1:
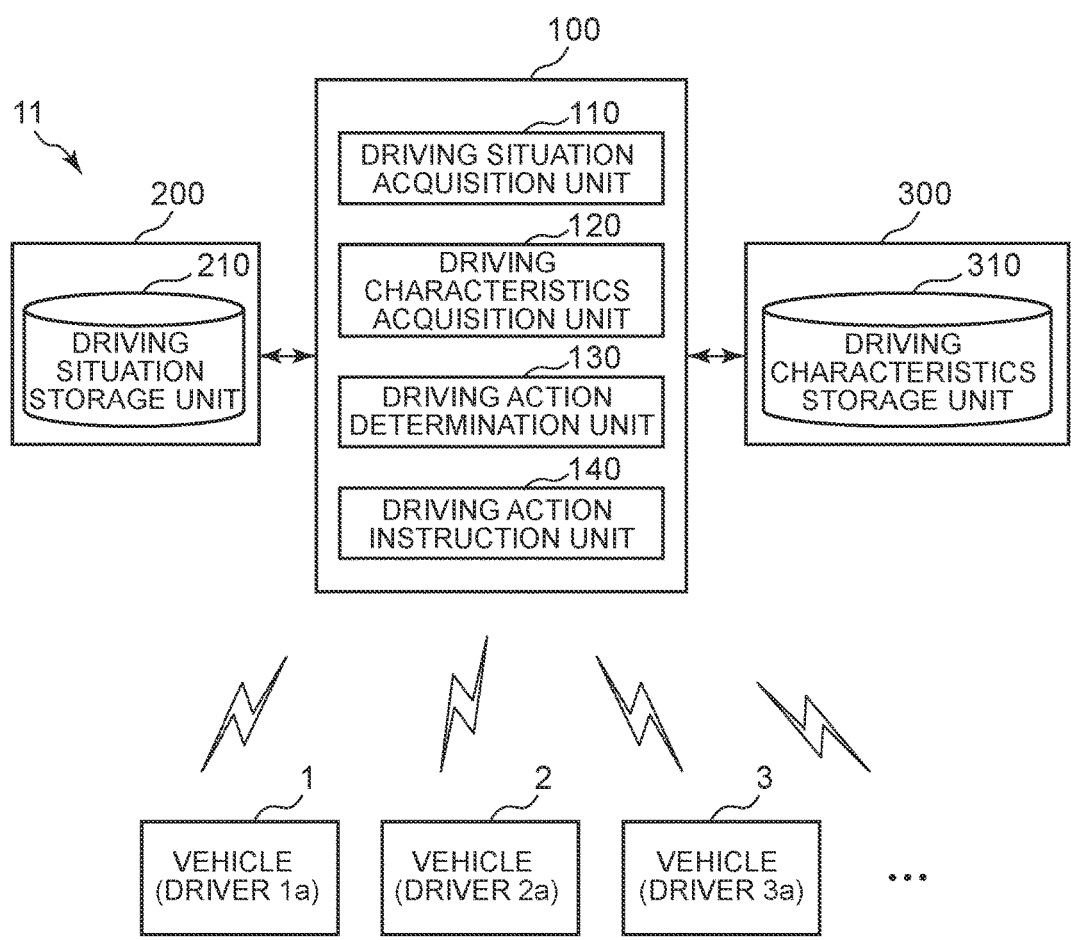
FIG. 1 is a diagram showing an example of a configuration of a driving assistance device according to a first embodiment.

FIG. 1 is a diagram showing an example of a configuration of a driving assistance system according to a first embodiment. A driving assistance system 11 in FIG. 1 is an example of a system for remotely providing driving assistance to a plurality of vehicles. The driving assistance system 11 includes a driving situation management server 200, a driving characteristics management server 300, and a driving assistance server 100. The function of each server is implemented by the processing performed by the Central Processor Unit (CPU). The functions of these servers may be implemented by one server.

The driving situation management server 200 is an example of a computer that manages the driving situations of a plurality of vehicles. The driving situation management server 200 detects the driving situation of each vehicle by using data (also referred to as "sensor data") obtained from a plurality of vehicles and a plurality of road infrastructures either wirelessly or via a cable. Detection in this context includes collection, estimation, prediction and so on. The driving situation management server 200 holds the detected driving situation of each vehicle in a driving situation storage unit 210 and, in response to a request from the driving assistance server 100, provides the driving situation of each vehicle, which meets the request, to the driving assistance server 100. The vehicle identification (ID) that identifies the vehicle, the driver ID that identifies the driver of the vehicle, and the time information on the driving situation are assigned to the driving situation of each vehicle by the driving situation management server 200.

The driving situation storage unit 210 stores the driving situation of each vehicle, detected by the driving situation management server 200, so that the stored driving situation can be read later. A specific example of the driving situation storage unit 210 is the so-called dynamic map.

The driving situation management server 200 holds the driving situation of each vehicle, detected using the obtained sensor data, in the driving situation storage unit 210. The driving situation includes, for example, the position information on the vehicle, the behavior information on the vehicle, the peripheral information on the vehicle, and so on. The position information includes, for example, the link ID of a link (a road between branch points) where the vehicle is currently present, the lane ID of a lane where the vehicle is currently located, the relative position information on the lane where the vehicle is currently present, the three-dimensional coordinate information on the position where the vehicle is currently present, and so on. The behavior information includes, for example, the speed vector (traveling direction and vehicle speed) of the vehicle, the operation state of the direction indicator, the lighting state of a light such as a headlight, the operation state of a wiper, and so on. The peripheral information includes, for example, the information on traffic lights (traffic light information), the road conditions, and so on. The traffic light information includes the ID of a traffic light, the current lighting state of the traffic light, the operation mode of the traffic light, and so on. The road conditions include, for example, the lane ID, road surface condition, average moving speed, average moving time, regulatory speed, and so on.

The driving situation, detected by the driving situation management server 200, includes the future driving situation of each vehicle predicted from the current driving situation of the vehicle. For example, using the current driving situations (position information, behavior information, peripheral information, etc.) of the vehicles, the driving situation management server 200 detects the driving situations of the vehicles that may collide with each other and stores the detected driving situations in the driving situation storage unit 210.

Figure 2:
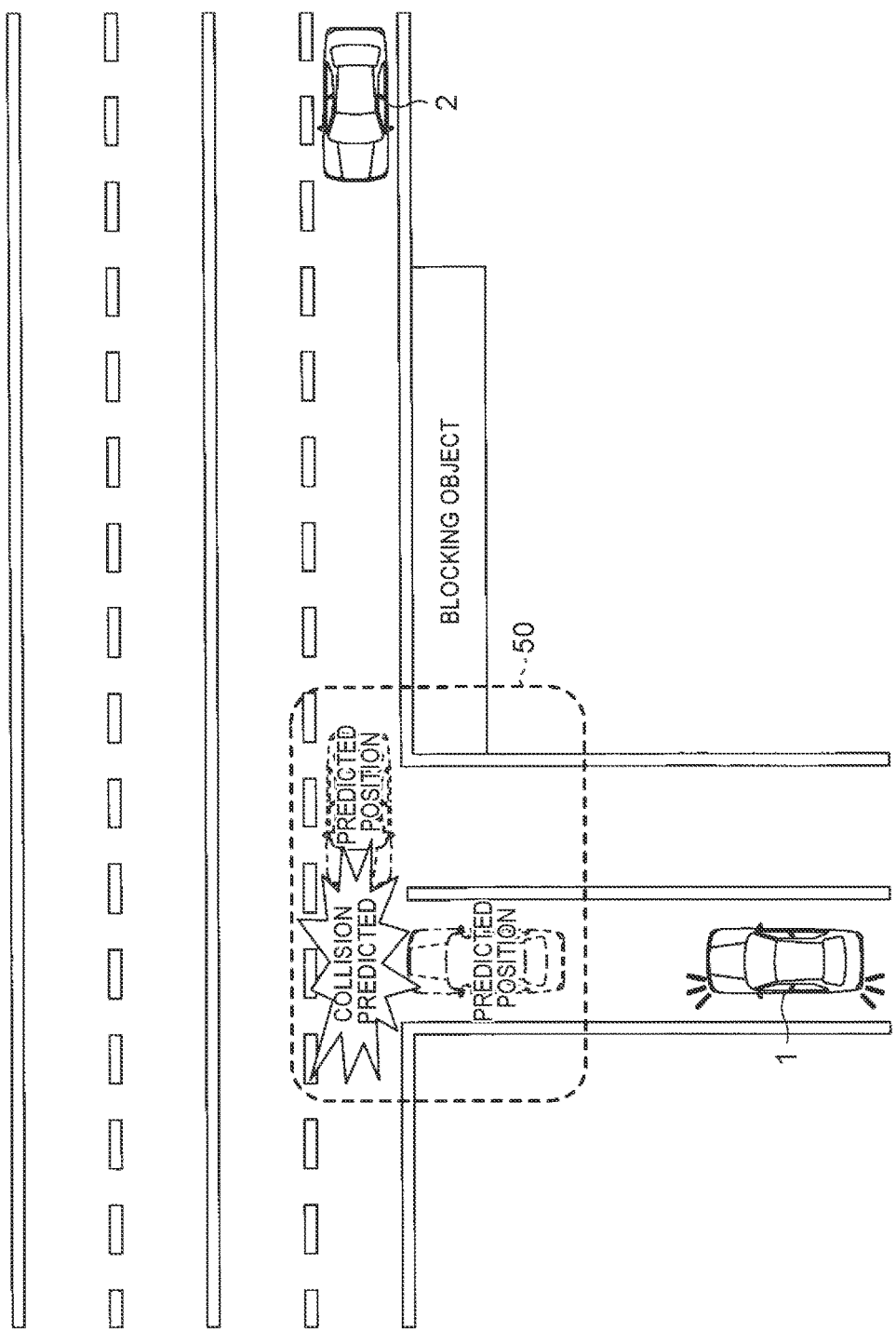
FIG. 2 is a diagram showing an example of the driving situations of vehicles that may collide with each other.

FIG. 2 is a diagram showing an example of the driving situation of the vehicles that may collide with each other. The driving situation management server 200 uses the current driving situations of the vehicles to predict the vehicles that may collide with each other, based on a predetermined collision prediction method. For example, the driving situation management server 200 predicts a first arrival time at which a vehicle 1 will reach the intersection, where the predicted course of the vehicle 1 and the predicted course of a vehicle 2 intersect, and a second arrival time at which the vehicle 2 will reach the intersection. If the difference between the first arrival time and the second arrival time is equal to or less than a predetermined time difference, the driving situation management server 200 predicts that the vehicle 1 and the vehicle 2 are in the driving situation in which they may collide at the intersection. Note that the method for predicting the vehicles that may collide with each other is not limited to the method described above but a known method may be applied.

In FIG. 1, the driving characteristics management server 300 is an example of a computer that manages the driving characteristics of the drivers of a plurality of vehicles. The driving characteristics of a driver represent the driving skill and the driving preference of the driver. The driving characteristics management server 300 collects the driving characteristics of the driver of each vehicle, either wirelessly or via a cable, based on a predetermined collection method. For example, the driving characteristics management server 300 collects the driving characteristics of each driver from the declared information uploaded by the driver himself/herself, the driving history information in which the driver's actual driving operation is automatically recorded, and the performance result information saved in a driving skill training center. The driving characteristics management server 300 holds the collected driving characteristics of each driver in a driving characteristics storage unit 310 and, in response to a request from the driving assistance server 100, provides the driving characteristics of each driver that meets the request to the driving assistance server 100. The driver ID, which identifies a driver, is assigned to each driver's driving characteristics by the driving characteristics management server 300.

When the vehicle is an autonomous vehicle, the computer that automatically controls the driving of the autonomous vehicle, or an occupant who receives driving assistance, may be regarded as the driver. The driving characteristics of the computer can be adjusted, for example, by a program constant.

The driving characteristics storage unit 310 stores the driving characteristics of each vehicle, collected by the driving characteristics management server 300, so that the stored driving characteristics can be read later. A specific example of the driving characteristics storage unit 310 is a hard disk.

Figures 3, 4:
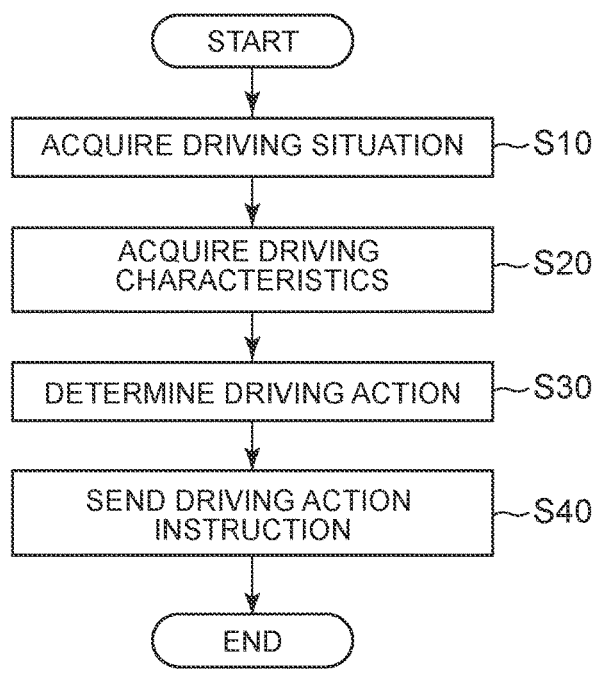
FIG. 3 is a diagram showing an example of the driving characteristics of drivers.
FIG. 4 is a flowchart showing an example of a driving assistance method.

FIG. 3 is a diagram showing an example of the driving characteristics of the drivers. The driving characteristics management server 300 digitizes the collected driving characteristics of the drivers and holds the digitized scores in the driving characteristics storage unit 310. FIG. 3 shows some examples of driving actions that are taken by each driver: "acceleration", "deceleration", "stopping", "lane changing" and "watching for cross traffic (look right and left of the host vehicle)". A driving action with a lower driving characteristics score indicates that the driver dislikes the action or the driver is not good at it. For example, the FIG. 3 indicates that the driver 1a is relatively good at changing the lane (score 6) but is not very good at acceleration (score 3).

In FIG. 1, the driving assistance server 100 is an example of a computer that remotely provides driving assistance to a plurality of vehicles (vehicles 1, 2, and 3 are illustrated in FIG. 1). The driving assistance server 100 is an example of a driving assistance device including a driving situation acquisition unit 110, a driving characteristics acquisition unit 120, a driving action determination unit 130, and a driving action instruction unit 140. The functions of the driving situation acquisition unit 110, driving characteristics acquisition unit 120, driving action determination unit 130, and driving action instruction unit 140 are implemented respectively by the processing performed by the CPU.

FIG. 4 is a flowchart showing an example of a driving assistance method.

In step S10, from the driving situation storage unit 210 of the driving situation management server 200, the driving situation acquisition unit 110 acquires, either wirelessly or via a cable, the driving situations of the vehicles that may collide with each other. For example, in the scene shown in FIG. 2, when a driving assistance request is received wirelessly from the vehicle 1 that is a driving assistance target, the driving situation acquisition unit 110 requests the driving situation management server 200 to provide the driving situation of the vehicle 1 and the driving situation of another vehicle that may collide with the vehicle 1. Upon receiving the driving situation providing request from the driving situation acquisition unit 110, the driving situation management server 200 predicts the presence of the vehicle 2 that may collide with the vehicle 1 based on a predetermined collision prediction method. Then, the driving situation management server 200 provides the driving situations (for example, position information, behavior information, peripheral information, etc.) of the vehicles 1 and 2, which may collide with each other, to the driving assistance server 100. As a result, the driving situation acquisition unit 110 can acquire the driving situation of each of the vehicles 1 and 2 that may collide with each other.

In step S20, the driving characteristics acquisition unit 120 acquires the driving characteristics of the drivers of the vehicles, which may collide with each other, from the driving characteristics storage unit 310 of the driving characteristics management server 300 either wirelessly or via a cable. For example, in the scene shown FIG. 2, the driving characteristics acquisition unit 120 requests the driving characteristics management server 300 to provide the driving characteristics of the driver of each of the vehicles 1 and 2 whose driving situations were acquired by the driving situation acquisition unit 110. More specifically, the driving characteristics acquisition unit 120 requests the driving characteristics management server 300 to provide the driving characteristics of the drivers each corresponding to the driver ID assigned to the driving situation of each vehicle acquired by the driving situation acquisition unit 110. Upon receiving the driving characteristics providing request from the driving characteristics acquisition unit 120, the driving characteristics management server 300 provides the driving characteristics of each of the driver 1a of the vehicle 1 and the driver 2a of the vehicle 2 from the driving characteristics storage unit 310 to the driving assistance server 100. As a result, the driving characteristics acquisition unit 120 can acquire the driving characteristics of the drivers of the vehicles 1 and 2 that may collide with each other.

In step S30, the driving action determination unit 130 determines the driving actions that allow the vehicles to avoid collision in the driving situation acquired by the driving situation acquisition unit 110 and that match the driving characteristics acquired by the driving characteristics acquisition unit 120. For example, in the scene shown in FIG. 2 where the vehicle 1 traveling on a feeder road and the vehicle 2 traveling on the main road may collide with each other at an intersection 50, the driving action determination unit 130 determines the driving actions, which allow the vehicles 1 and 2 to avoid collision with each other, by taking into account the driving characteristics of the drivers of the vehicles 1 and 2.

In step S40, the driving action instruction unit 140 wirelessly sends an instruction about the driving action, determined by the driving action determination unit 130, to each of the vehicles that may collide with each other. For example, in the scene shown in FIG. 2, the driving action instruction unit 140 sends an instruction about the driving action, which was determined in step S30 by taking into consideration the driving characteristics of each of the drivers of the vehicles 1 and 2, to each of the vehicles 1 and 2. Thus, before the vehicles 1 and 2 enter the intersection 50, the drivers of the vehicles 1 and 2 can know the driving actions suitable for their driving characteristics. The drivers of the vehicles 1 and 2 can avoid collision at the intersection 50 by driving their vehicles according to the instructed driving actions.

In this way, the driving actions are determined by considering the driving characteristics of the drivers of the vehicles that may collide with each other, and the determined driving actions are sent each as an instruction to each of the vehicles. Therefore, appropriate driving assistance can be provided to the vehicles.

Next, this embodiment will be described with reference to some examples of driving assistance scenes.

<First Example of Driving Assistance at Merging Time>

Figure 5:
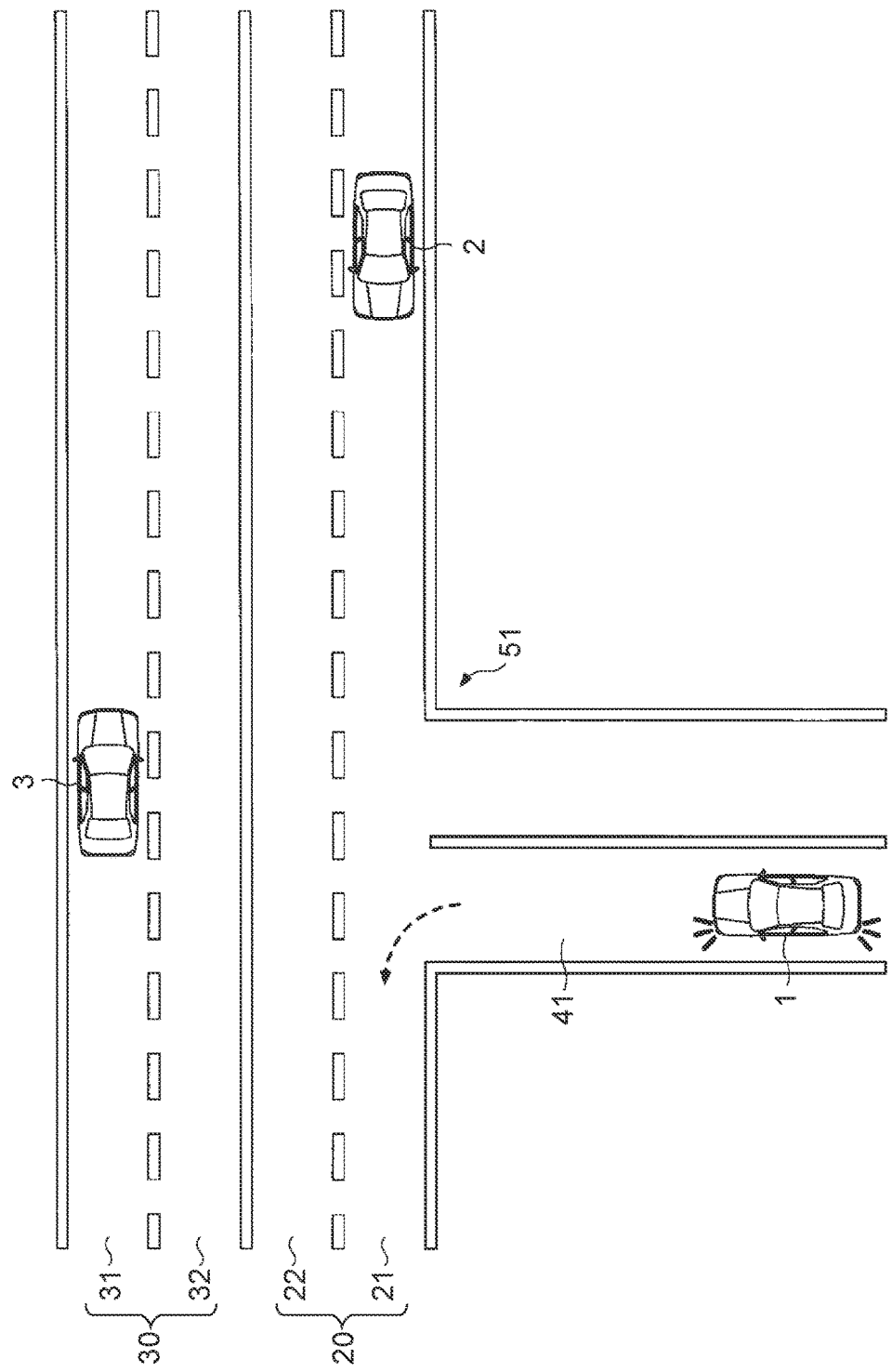
FIG. 5 is a diagram showing an example of a driving assistance scene in which a vehicle performs left-turn merging when traveling on the left side of a road.

FIG. 5 is a diagram showing an example of a driving assistance scene in which a vehicle performs left-turn merging when traveling on the left side of a road. FIG. 5 shows a scene in which a two-lane feeder road is connected to a four-lane main road at an intersection 51 and in which the vehicle 1 traveling in a lane 41 of the feeder road is going to merge into a roadway 20 of the main road on which the vehicle 2 is traveling. The vehicle 1 is traveling in the lane 41 of the feeder road, the vehicle 2 is traveling in a lane 21 that is one of the two lanes 21 and 22 of the roadway 20, and a vehicle 3 is traveling in a lane 31 that is one of the two lanes 31 and 32 of a roadway 30.

When a driving assistance request for left-turn merging at the intersection 51 is received from the vehicle 1 that is a driving assistance target, the driving situation acquisition unit 110 acquires the driving situation of the vehicle 1 and the driving situation of the vehicle 2, which may collide with the vehicle 1, from the driving situation storage unit 210 of the driving situation management server 200. The driving situation acquisition unit 110 acquires the driving situation indicating that the vehicle 1 travelling in the lane 41 is going to turn left at the intersection 51 and the driving situation indicating that the vehicle 2 traveling in the lane 21 is traveling toward the intersection 51.

When the driving situations of the vehicles 1 and 2 that may collide with each other are acquired by the driving situation acquisition unit 110, the driving action determination unit 130 generates a plurality of combinations of driving actions that allow the vehicles 1 and 2 to avoid collision in the driving situations acquired by the driving situation acquisition unit 110.

Figure 6:
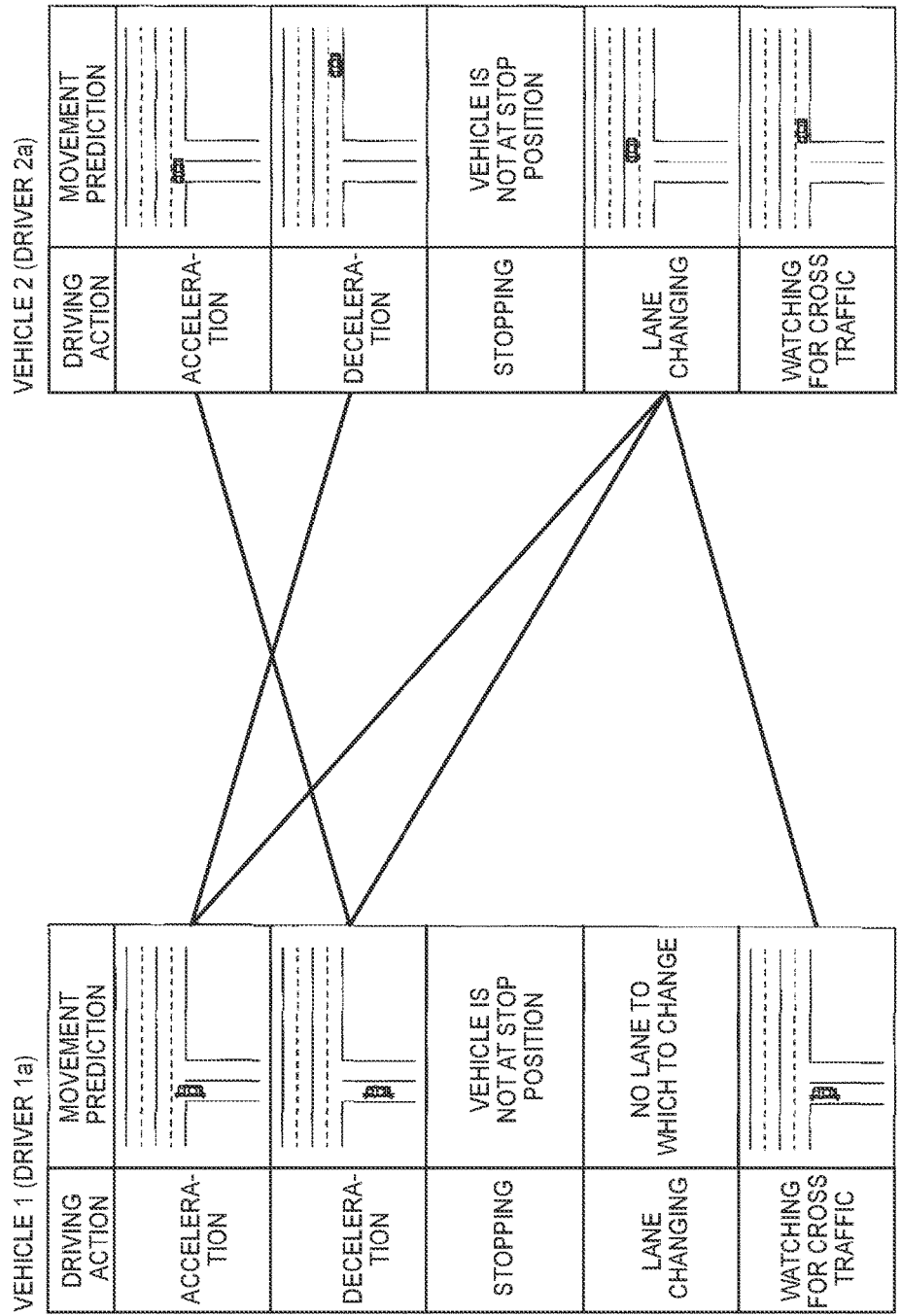
FIG. 6 is a diagram showing an example of a method for generating a plurality of combinations of driving actions that can avoid collision in the driving assistance scene shown in FIG. 5.

FIG. 6 is a diagram showing an example of a method for generating a plurality of combinations of driving actions that can avoid collision in the driving assistance scene shown in FIG. 5. In FIG. 6, the driving action determination unit 130 generates five combinations of driving actions that allow the vehicles 1 and 2 to avoid collision in the driving situation in which the vehicle 1, which is going to turn left at the intersection 51, may collide with the vehicle 2. For example, as one of the combinations of driving actions by which the vehicles 1 and 2 can avoid collision in the driving situation, the driving action determination unit 130 generates a combination of driving actions that cause the vehicle 1 to accelerate and the vehicle 2 to decelerate.

The driving action determination unit 130 does not select stopping as the driving actions of the vehicles 1 and 2 because the driving situation acquisition unit 110 has acquired the situations indicating that the vehicles 1 and 2 are not present at a stop position. In addition, since the driving situation acquisition unit 110 has acquired the situation indicating that the vehicle 1 is traveling on the feeder road on which there is no lane to which the vehicle can change, the driving action determination unit 130 does not select lane changing as a driving action of the vehicle 1.

FIG. 7 is a diagram showing an example of a method for selecting a combination, which matches the driving characteristics of the drivers, from the plurality of combinations generated in FIG. 6. The driving action determination unit 130 assigns scores (see FIG. 3), acquired by the driving characteristics acquisition unit 120 from the driving characteristics storage unit 310, to the driving characteristics included in each of the five combinations of driving actions generated in FIG. 6. For example, in FIG. 3, the score of acceleration of the driver 1a of the vehicle 1 is 3 and the score of deceleration of the driver 2a of the vehicle 2 is 5. Therefore, as shown in FIG. 7, the driving action determination unit 130 calculates the score of the combination of driving actions, in which the vehicle 1 is accelerated and the vehicle 2 is decelerated, as 8=(3+5). For each of the other combinations of driving actions, the driving action determination unit 130 calculates the score in the same way.

The driving action determination unit 130 can select the best combination of driving actions for the drivers 1a and 2a by selecting the combination having the maximum score from the five combinations. In the combinations shown in FIG. 7, the driving action determination unit 130 selects "watching for cross traffic" as the best driving action of the driver 1a, and "lane changing to a lane 22" as the best driving action of the driver 2a.

The driving action instruction unit 140 instructs the vehicle 1 to watch for cross traffic, and the vehicle 2 to change the lane to the lane 22. As a result, the notification device mounted on the vehicle 1 can notify the driver 1a, via at least one of sound and display, that the driver should watch for left and right. The notification device mounted on the vehicle 2 can notify the driver 2a, via at least one of sound and display, that the driver should change the lane to the lane 22. These notifications cause the vehicles 1 and 2 to drive according to the indicated driving actions, thus avoiding collision at the intersection 51.

<Second Example of Driving Assistance at Merging Time>

Figure 8:
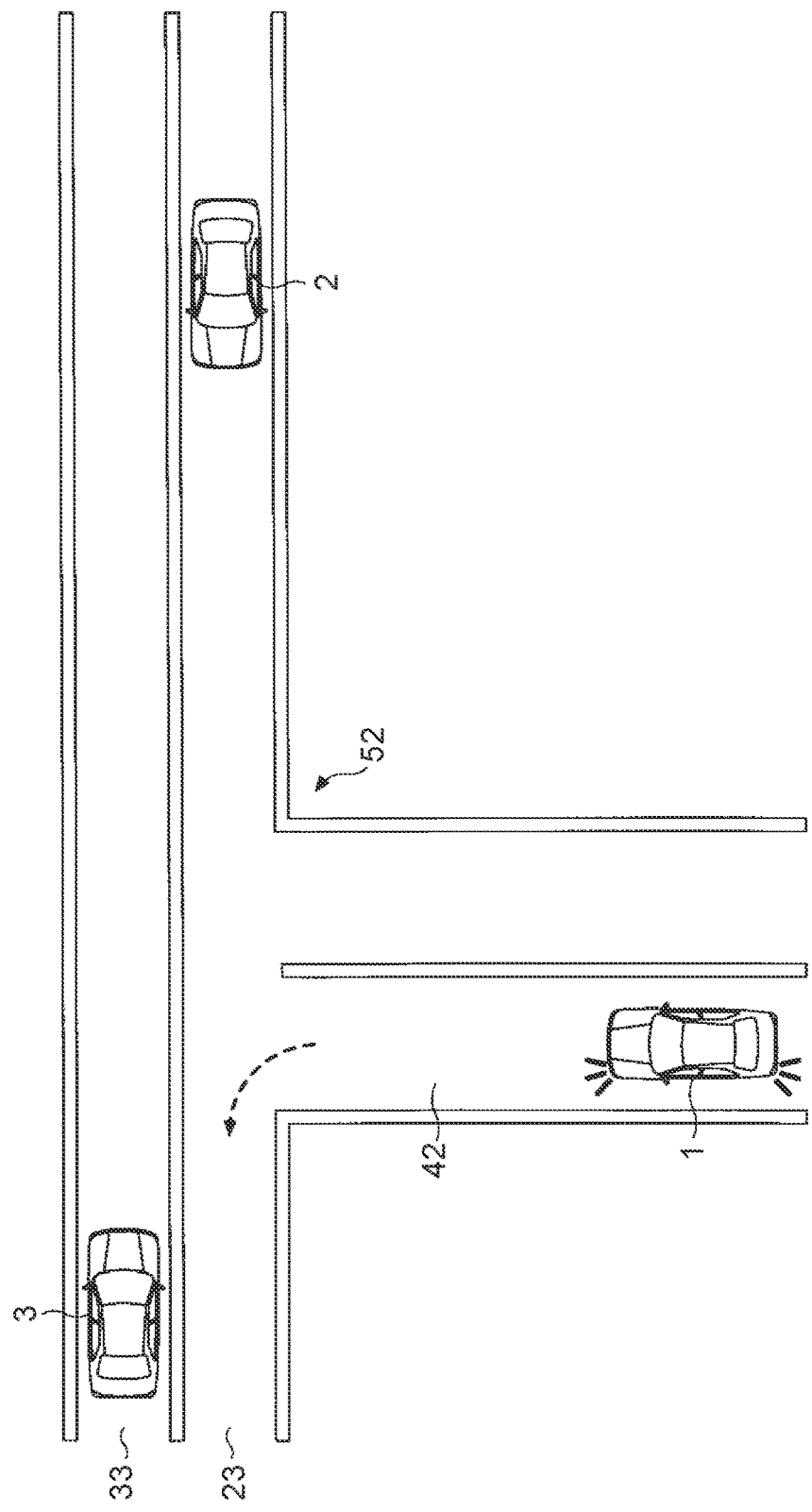
FIG. 8 is a diagram showing another example of a driving assistance scene in which a vehicle performs left-turn merging when traveling on the left side of a road.

FIG. 8 is a diagram showing another example of a driving assistance scene in which a vehicle performs left-turn merging when traveling on the left side of a road. FIG. 8 shows a scene in which a two-lane feeder road is connected to a two-lane main road at an intersection 52 and in which the vehicle 1 traveling in a lane 42 of the feeder road is going to merge into the lane 23 of the main road on which the vehicle 2 is traveling. The vehicle 1 is traveling in the lane 42 of the feeder road, the vehicle 2 is traveling in the lane 23 of the main road, and the vehicle 3 is traveling in a lane 33 of the main road. For the part similar to that in the driving assistance scene described above, the description above is applicable and thus the redundant description is omitted here.

When a driving assistance request for left-turn merging at the intersection 52 is received from the vehicle 1 that is a driving assistance target, the driving situation acquisition unit 110 acquires the driving situation of the vehicle 1 and the driving situation of the vehicle 2, which may collide with the vehicle 1, from the driving situation storage unit 210 of the driving situation management server 200. The driving situation acquisition unit 110 acquires the driving situation indicating that the vehicle 1 travelling in the lane 42 is going to turn left at the intersection 52 and the driving situation indicating that the vehicle 2 traveling in the lane 23 is traveling toward the intersection 52.

Figure 9:
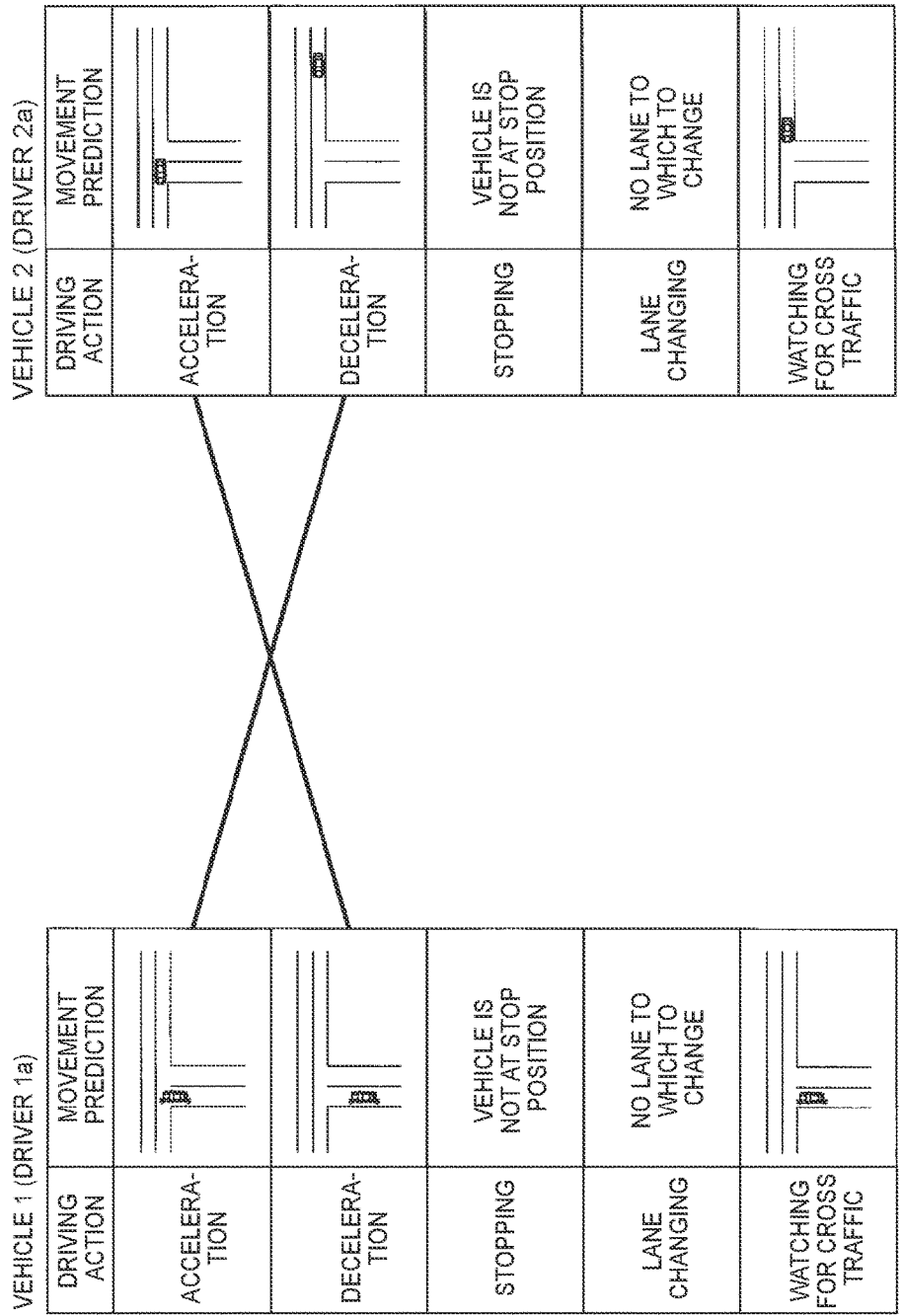
FIG. 9 is a diagram showing an example of a method for generating a plurality of combinations of driving actions that can avoid collision in the driving assistance scene shown in FIG. 8.

FIG. 9 is a diagram showing an example of a method for generating a plurality of combinations of driving actions that can avoid collision in the driving assistance scene shown in FIG. 8. In FIG. 9, the driving action determination unit 130 generates two combinations of driving actions that allow the vehicles 1 and 2 to avoid collision in the driving situation in which the vehicle 1, which is going to turn left at the intersection 52, may collide with the vehicle 2.

Since the driving situation acquisition unit 110 has acquired the situation indicating that the vehicle 2 is traveling on the main road on which there is no lane to which the vehicle can change, the driving action determination unit 130 does not select lane changing as a driving action of the vehicle 2.

FIG. 10 is a diagram showing an example of a method for selecting a combination, which matches the driving characteristics of the drivers, from the plurality of combinations generated in FIG. 9. The driving action determination unit 130 assigns scores (see FIG. 3), acquired by the driving characteristics acquisition unit 120 from the driving characteristics storage unit 310, to the driving characteristics included in each of the two combinations of driving actions generated in FIG. 9 and then calculates the score of each combination.

The driving action determination unit 130 can select the best combination of driving actions for the drivers 1a and 2a by selecting the combination having the maximum score from the two combinations. In the combinations shown in FIG. 10, the driving action determination unit 130 selects "deceleration" as the best driving action of the driver 1a, and "acceleration" as the best driving action of the driver 2a.

The driving action instruction unit 140 instructs the vehicle 1 to decelerate, and the vehicle 2 to accelerate. As a result, the notification device mounted on the vehicle 1 can notify the driver 1a, via at least one of sound and display, that the driver should decelerate the vehicle 1. The notification device mounted on the vehicle 2 can notify the driver 2a, via at least one of sound and display, that the driver should accelerate the vehicle 2. These notifications cause the vehicles 1 and 2 to drive according to the indicated driving actions, thus avoiding collision at the intersection 52.

<An Example of Driving Assistance at Right-Turn Time>

Figure 11:
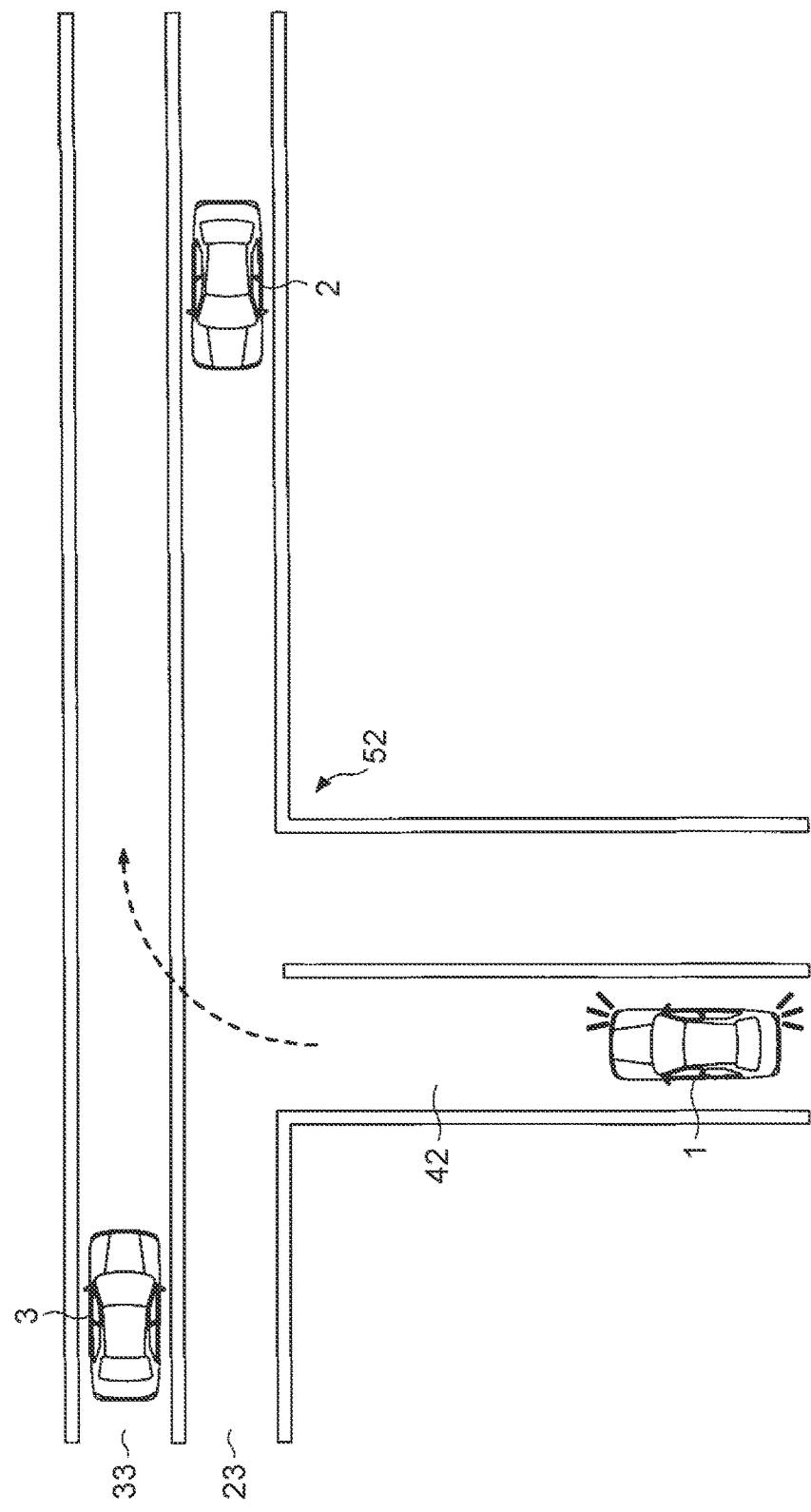
FIG. 11 is a diagram showing an example of a driving assistance scene in which a vehicle performs right-turn merging when traveling on the left side of a road.

FIG. 11 is a diagram showing an example of a driving assistance scene in which a vehicle performs right-turn merging when traveling on the left side of a road. For the part similar to that in the driving assistance scene described above, the description above is applicable and thus the redundant description is omitted here.

When a driving assistance request for right-turn merging at the intersection 52 is received from the vehicle 1 that is a driving assistance target, the driving situation acquisition unit 110 acquires the driving situation of the vehicle 1 and the driving situations of the vehicles 2 and 3, which may collide with the vehicle 1, from the driving situation storage unit 210 of the driving situation management server 200. The driving situation acquisition unit 110 acquires the driving situation indicating that the vehicle 1 travelling in the lane 42 is going to turn right at the intersection 52 and the driving situation indicating that the vehicle 2 traveling in the lane 23 is traveling toward the intersection 52. In addition, the driving situation acquisition unit 110 acquires the driving situation indicating that the vehicle 3 traveling in the lane 33 is traveling toward the intersection 52.

Figure 12:
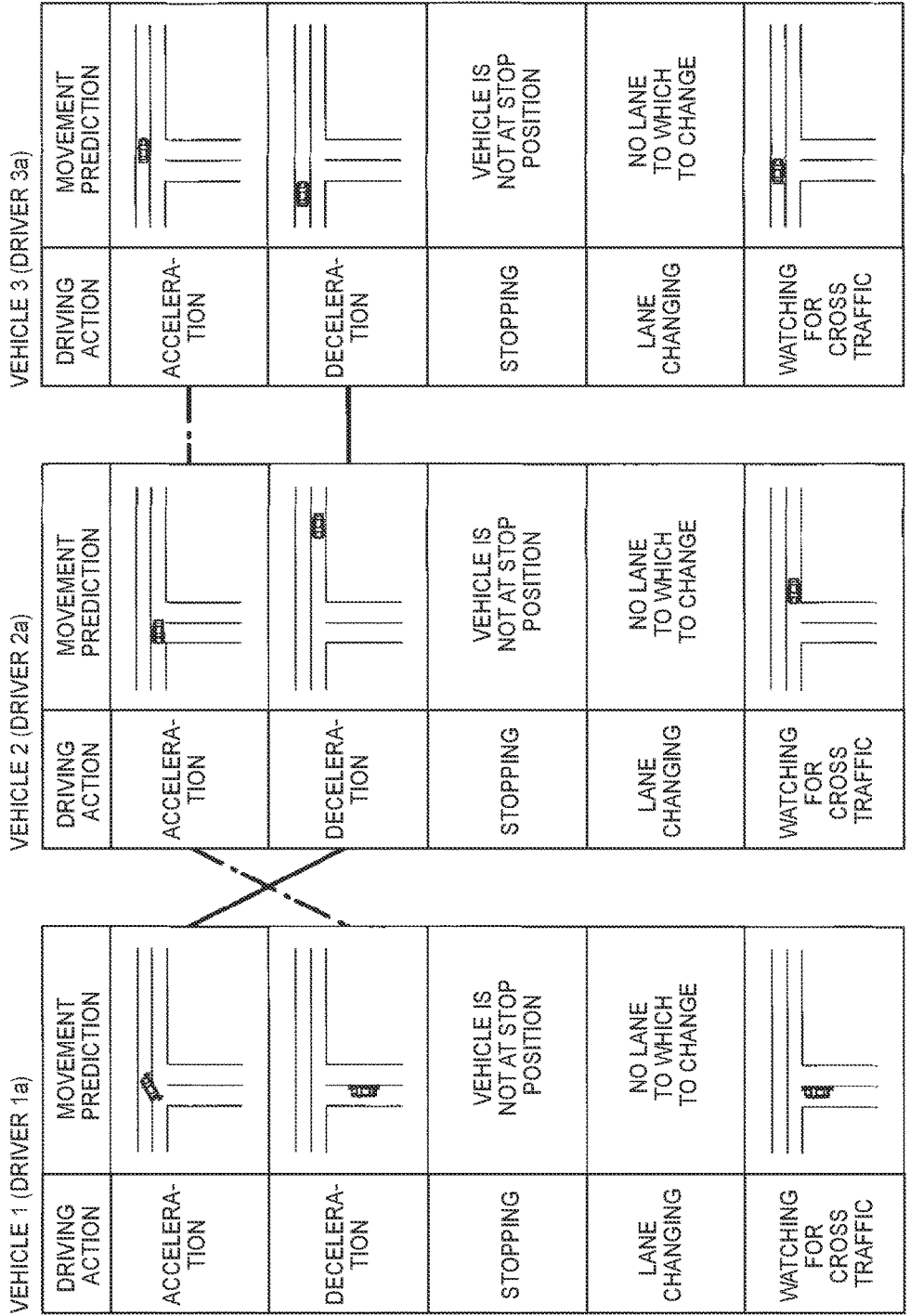
FIG. 12 is a diagram showing an example of a method for generating a plurality of combinations of driving actions that can avoid collision in the driving assistance scene shown in FIG. 11.

FIG. 12 is a diagram showing an example of a method for generating a plurality of combinations of driving actions that can avoid collision in the driving assistance scene shown in FIG. 11. In FIG. 12, the driving action determination unit 130 generates two combinations of driving actions that can avoid collision among the vehicles 1, 2, and 3 in the driving situation in which the vehicle 1, which is going to turn right at the intersection 52, may collide with the vehicle 2 or 3.

FIG. 13 is a diagram showing an example of a method for selecting a combination, which that matches the driving characteristics of the drivers, from the plurality of combinations generated in FIG. 12. The driving action determination unit 130 assigns scores (see FIG. 3), acquired by the driving characteristics acquisition unit 120 from the driving characteristics storage unit 310, to the driving characteristics included in each of the two combinations of driving actions generated in FIG. 12. For example, in FIG. 3, the score of acceleration of the driver 1a of the vehicle 1 is 3, the score of deceleration of the driver 2a of the vehicle 2 is 5, and the score of deceleration of the driver 3a of the vehicle 3 is 4. Therefore, as shown in FIG. 13, the driving action determination unit 130 calculates the score of the combination of driving actions, in which the vehicle 1 is accelerated, the vehicle 2 is decelerated, and the vehicle 3 is decelerated, as 12=(3+5+4). For each of the other combinations of driving actions, the driving action determination unit 130 calculates the score in the same way.

The driving action determination unit 130 can select the best combination of driving actions for the drivers 1a, 2a, and 3a by selecting the combination having the maximum score from the two combinations. In the combinations shown in FIG. 13, the driving action determination unit 130 selects "deceleration" as the best driving action of the driver 1a, "acceleration" as the best driving action of the driver 2a, and "acceleration" as the best driving action of the driver 3a.

The driving action instruction unit 140 instructs the vehicle 1 to decelerate, the vehicle 2 to accelerate, and the vehicle 3 to accelerate. As a result, the notification device mounted on the vehicle 1 can notify the driver 1a, via at least one of sound and display, that the driver should decelerate the vehicle 1. The notification device mounted on the vehicle 2 can notify the driver 2a, via at least one of sound and display, that the driver should accelerate the vehicle 2. The notification device mounted on the vehicle 3 can notify the driver 3a, via at least one of sound and display, that the driver should accelerate the vehicle 3. These notifications cause the vehicles 1, 2, and 3 to drive according to the indicated driving actions, thus avoiding collision at the intersection 52.

<First Example of Driving Assistance at Lane Change Time>

Figure 14:
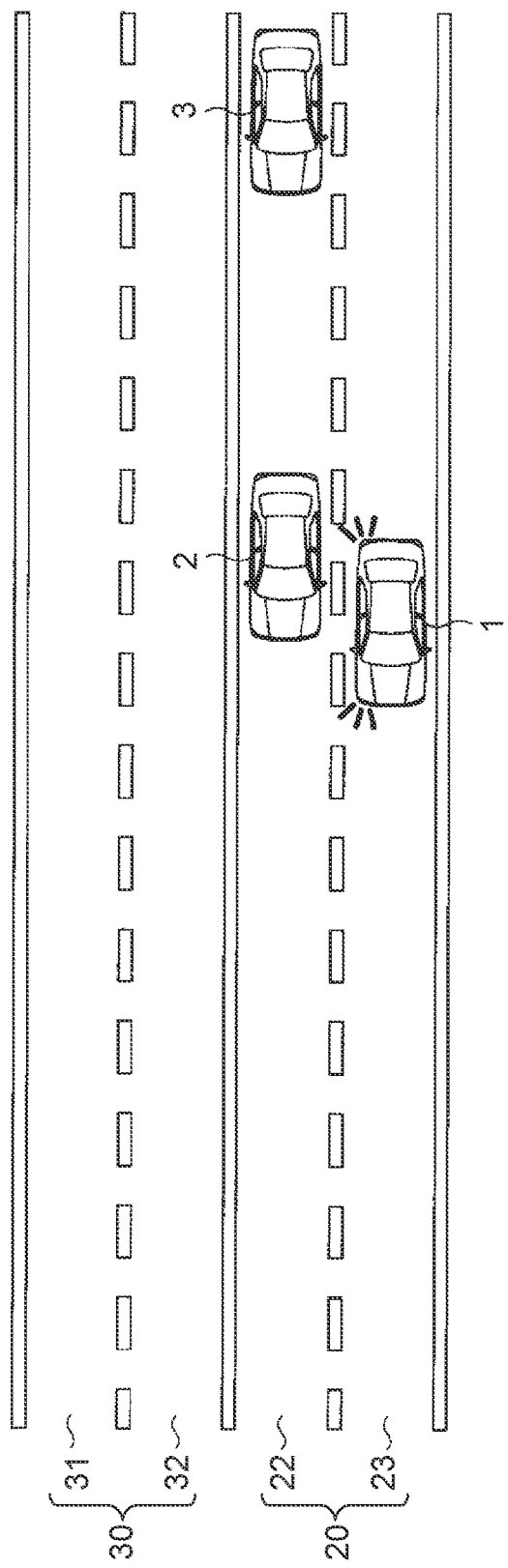
FIG. 14 is a diagram showing an example of a driving assistance scene in which a vehicle changes the lane when traveling on the left side of the road.

FIG. 14 is a diagram showing an example of a driving assistance scene in which a vehicle changes the lane when traveling on the left side of the road. The vehicle 1 is traveling in the lane 23 of the roadway 20, the vehicle 2 is traveling in the lane 22 of the roadway 20 on the right side of the vehicle 1, and the vehicle 3 is traveling in the lane 22 behind the vehicle 2. For the part similar to that in the driving assistance scene described above, the description above is applicable and thus the redundant description is omitted here.

When a driving assistance request for lane changing to the lane 22 is received from the vehicle 1 that is a driving assistance target, the driving situation acquisition unit 110 acquires the driving situation of the vehicle 1 and the driving situations of the vehicles 2 and 3, which may collide with the vehicle 1, from the driving situation storage unit 210 of the driving situation management server 200. The driving situation acquisition unit 110 acquires the driving situation indicating that the vehicle 1 travelling in the lane 23 is going to change the lane to the lane 22 and the driving situation indicating that the vehicle 2 is traveling in the lane 22 on the right side of the vehicle 1. In addition, the driving situation acquisition unit 110 acquires the driving situation indicating that the vehicle 3 is traveling in the lane 22 behind the vehicle 2.

Figure 15:
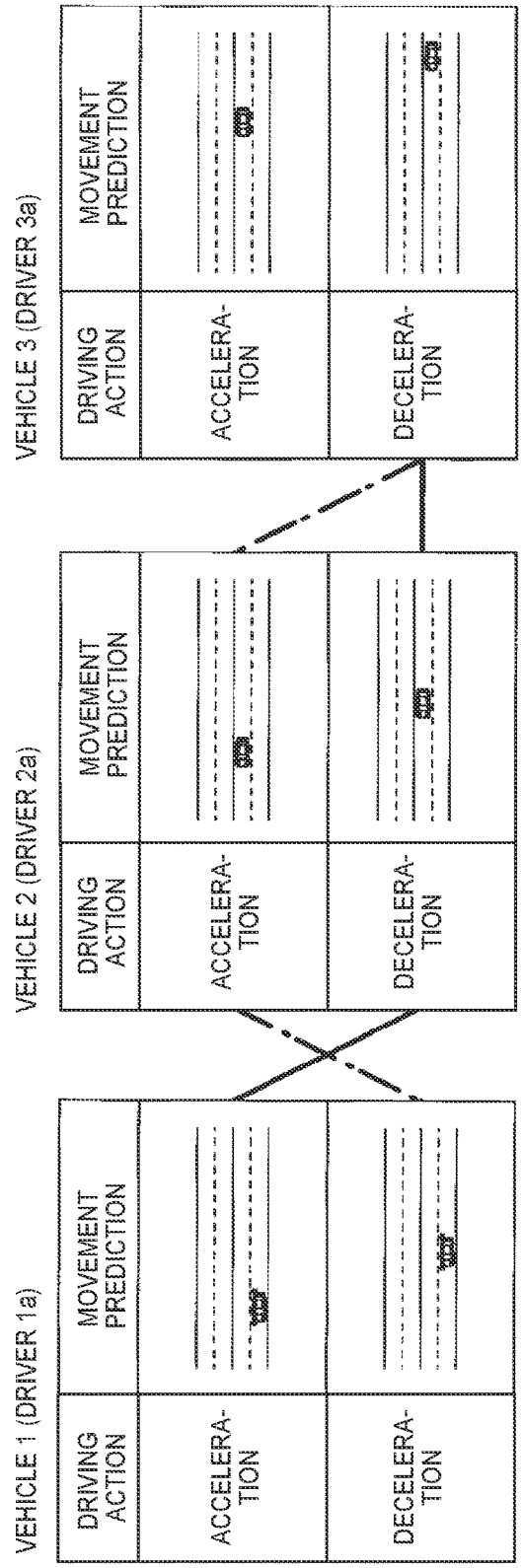
FIG. 15 is a diagram showing an example of a method for generating a plurality of combinations of driving actions that can avoid collision in the driving assistance scene shown in FIG. 14.

FIG. 15 is a diagram showing an example of a method for generating a plurality of combinations of driving actions that can avoid collision in the driving assistance scene shown in FIG. 14. In FIG. 15, the driving action determination unit 130 generates two combinations of driving actions that can avoid collision among the vehicles 1, 2, and 3 in the driving situation in which the vehicle 1, which is going to change the lane to the lane 22, may collide with the vehicle 2 or 3.

FIG. 16 is a diagram showing an example of a method for selecting a combination, which matches the driving characteristics of the drivers, from the plurality of combinations generated in FIG. 15. The driving action determination unit 130 assigns scores (see FIG. 3), acquired by the driving characteristics acquisition unit 120 from the driving characteristics storage unit 310, to the driving characteristics included in each of the two combinations of driving actions generated in FIG. 15 and then calculates the score of each combination.

The driving action determination unit 130 can select the best combination of driving actions for the drivers 1*a*, 2*a*, and 3*a* by selecting the combination having the maximum score from the two combinations. In the combinations shown in FIG. 16, the driving action determination unit 130 selects "deceleration" as the best driving action of the driver 1*a*, "acceleration" as the best driving action of the driver 2*a*, and "deceleration" as the best driving action of the driver 3*a*.

The driving action instruction unit 140 instructs the vehicle 1 to decelerate, the vehicle 2 to accelerate, and the vehicle 3 to decelerate. As a result, the notification device mounted on the vehicle 1 can notify the driver 1*a*, via at least one of sound and display, that the driver should decelerate the vehicle 1. The notification device mounted on the vehicle 2 can notify the driver 2*a*, via at least one of sound and display, that the driver should accelerate the vehicle 2. The notification device mounted on the vehicle 3 can notify the driver 3*a*, via at least one of sound and display, that the driver should decelerate the vehicle 3. These notifications cause the vehicles 1, 2, and 3 to drive according to the indicated driving actions, thus avoiding collision. In addition, these notifications allow the driver 1*a* to easily change the lane of the vehicle 1 to the lane 22 into the space between the vehicle 2 and the vehicle 3.

<Second Example of Driving Assistance at Lane Change Time>

Figure 17:
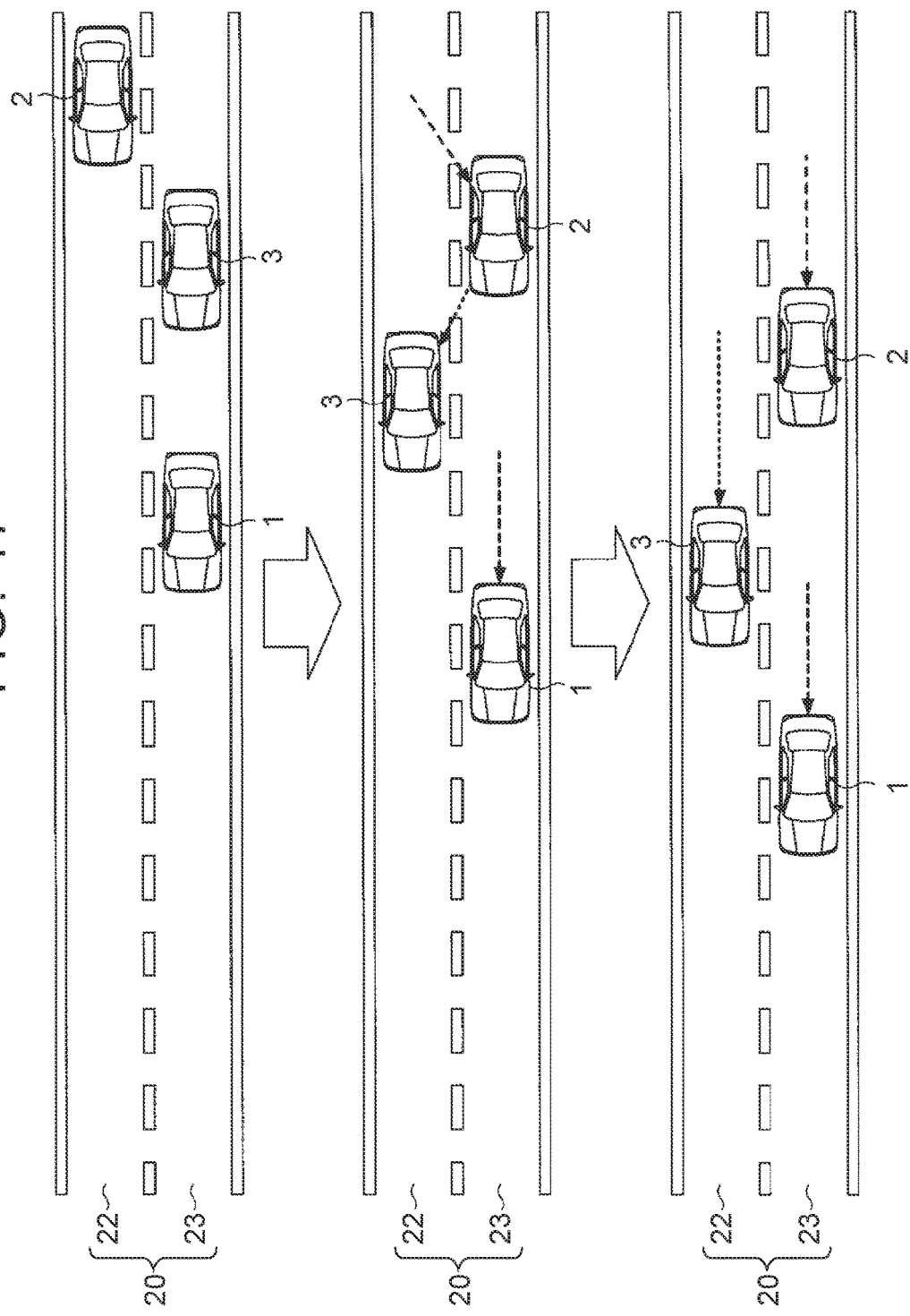
FIG. 17 is a diagram showing another example of a driving assistance scene in which a vehicle changes the lane.

FIG. 17 is a diagram showing another example of a driving assistance scene in which a vehicle changes the lane. FIG. 17 shows a scene in which instructions are sent to the vehicles to indicate the traveling lanes each of which matches the driving characteristics of each driver. The vehicle 1 is traveling in the lane 23 of the roadway 20, the vehicle 3 is traveling in the lane 23 behind the vehicle 1, and the vehicle 2 is traveling in the lane 22 of the roadway 20 right behind the vehicle 3. The roadway 20 has two lanes: the lane 23 for a driver who wants to travel at a reduced vehicle speed and the lane 22 for a driver who wants to increase the vehicle speed. For the part similar to that in the driving assistance scene described above, the description above is applicable and thus the redundant description is omitted here.

When a driving assistance request for lane changing to the lane 22 is received from the vehicle 3 that is a driving assistance target, the driving situation acquisition unit 110 acquires the driving situation of the vehicle 3 and the driving situations of the vehicles 1 and 2, which may collide with the vehicle 3, from the driving situation storage unit 210 of the driving situation management server 200. The driving situation acquisition unit 110 acquires the driving situation indicating that the vehicle 3 travelling in the lane 23 is going to change the lane to the lane 22 and the driving situation indicating that the vehicle 1 is traveling in the lane 23 ahead of the vehicle 3. In addition, the driving situation acquisition unit 110 acquires the driving situation indicating that the vehicle 2 is traveling in the lane 22 right behind the vehicle 3.

Figure 18:
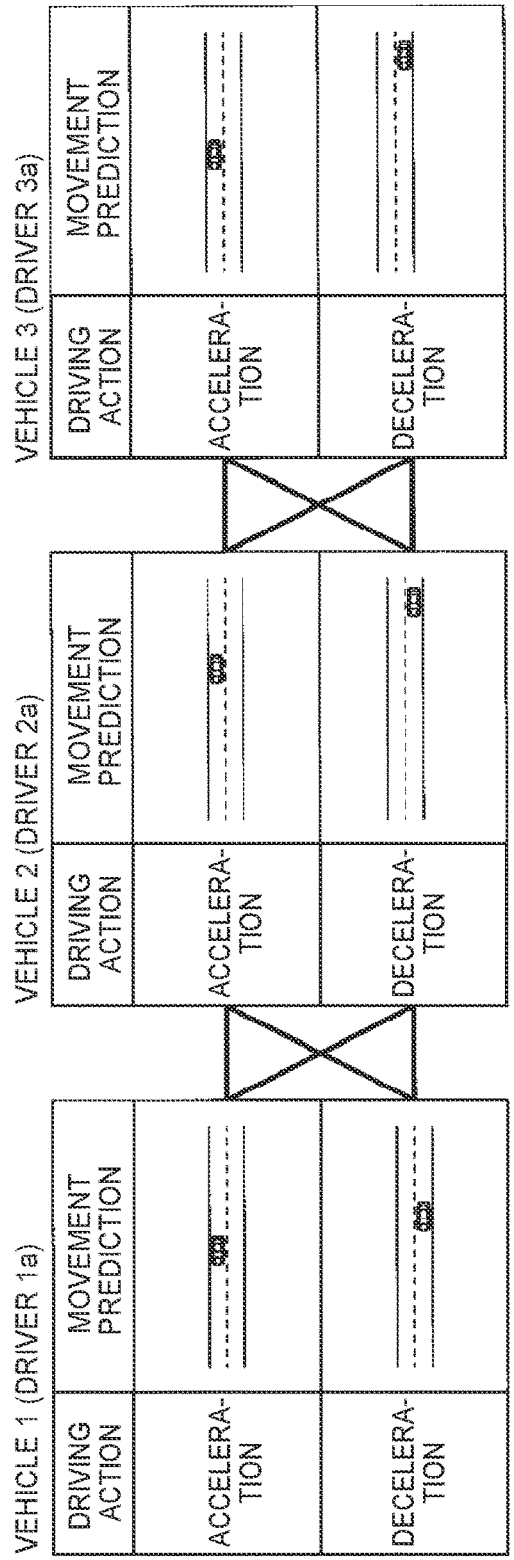
FIG. 18 is a diagram showing an example of a method for generating a plurality of combinations of driving actions that can avoid collision in the driving assistance scene shown in FIG. 17.

FIG. 18 is a diagram showing an example of a method for generating a plurality of combinations of driving actions that can avoid collision in the driving assistance scene shown in FIG. 17. In FIG. 18, the driving action determination unit 130 generates eight combinations of driving actions that can avoid collision among vehicles 1, 2, and 3 in the driving situation in which the vehicle 3, which is going to change the lane to the lane 22, may collide with the vehicle 1 or 2.

FIG. 19 is a diagram showing an example of a method for selecting a combination, which matches the driving characteristics of the drivers, from the plurality of combinations generated in FIG. 18. The driving action determination unit 130 assigns scores (see FIG. 3), acquired by the driving characteristics acquisition unit 120 from the driving characteristics storage unit 310, to the driving characteristics included in each of the eight combinations of driving actions generated in FIG. 18 and then calculates the score of each combination.

The driving action determination unit 130 can select the best combination of driving actions for the drivers 1*a*, 2*a*, and 3*a* by selecting the combination having the maximum score from the eight combinations. In the combinations shown in FIG. 19, the driving action determination unit 130 selects "deceleration" as the best driving action of the driver 1*a*, "acceleration or deceleration" as the best driving action of the driver 2*a*, and "acceleration" as the best driving action of the driver 3*a*.

Therefore, the vehicles 1, 2, 3 can avoid collision with each other by driving according to the indicated driving actions. The driver 1*a* who is not good at acceleration can easily keep traveling with the vehicle 1 in the lane 23 that is a lane for a driver who wants to travel at a reduced speed. The driver 2*a* who is not very good at acceleration can easily change the lane from the lane 22 that is a lane for a driver who wants to increase the vehicle speed to the lane 23 that is a lane for a driver who wants to travel at a reduced vehicle speed. The driver 3*a*, who is good at acceleration, can easily change the lane from the lane 23 that is a lane for a driver who wants to travel at a reduced vehicle speed to the lane 22 that is a lane for a driver who wants to increase the vehicle speed.

Second Embodiment

FIG. 20 is a diagram showing an example of a configuration of a driving assistance system according to a second embodiment. A driving assistance system 12 in FIG. 20 is an example of a system for providing driving assistance to a plurality of vehicles. The configuration of the driving assistance system 12 is different from the configuration shown in FIG. 1 in that a driving assistance Electronic Control Unit (ECU) 400 mounted on the vehicle is provided instead of the driving assistance server 100 in FIG. 1. The driving assistance ECU 400 has the function similar to that of the driving assistance server 100. The driving assistance ECU 400 may be mounted on any of the vehicles other than the vehicle 1 such as the vehicles 2 and 3.

The driving assistance ECU 400 is an example of a driving assistance device including a driving situation acquisition unit 410, a driving characteristics acquisition unit 420, a driving action determination unit 430, and a driving action instruction unit 440. The functions of the driving situation acquisition unit 410, driving characteristics acquisition unit 420, driving action determination unit 430, and driving action instruction unit 440 are implemented respectively by the processing executed by the CPU. For the same part as that in the first embodiment, the description given above is applicable and thus the redundant description is omitted.

In the second embodiment, the vehicles that may collide with each other include a host vehicle (vehicle 1 in FIG. 20) on which the driving assistance ECU 400 is mounted.

The driving situation acquisition unit 410 wirelessly acquires the driving situations of the vehicles, which may collide with each other, from the driving situation storage unit 210 of the driving situation management server 200. For example, in FIG. 2, when a driving assistance request occurs in the vehicle 1, the driving situation acquisition unit 410 requests the driving situation management server 200 to provide the driving situation of the vehicle 1 and the driving situation of another vehicle that may collide with the vehicle 1. Upon receiving the driving situation providing request from the driving situation acquisition unit 410, the driving situation management server 200 predicts whether there is the vehicle 2, which may collide with the vehicle 1, based on a predetermined collision prediction method. Then, the driving situation management server 200 wirelessly provides the driving situations (e.g., position information, behavior information, peripheral information, etc.) of the vehicles 1 and 2, which may collide with each other, to the driving assistance ECU 400. As a result, the driving situation acquisition unit 410 can acquire the driving situation of each of the vehicles 1 and 2 that may collide with each other.

The driving characteristics acquisition unit 420 wirelessly acquires the driving characteristics of the drivers of the vehicles, which may collide with each other, from the driving characteristics storage unit 310 of the driving characteristics management server 300. For example, in FIG. 2, the driving characteristics acquisition unit 420 requests the driving characteristics management server 300 to provide the driving characteristics of the driver of each of the vehicles 1 and 2 whose driving situations have been acquired by the driving situation acquisition unit 410. Upon receiving the driving characteristics providing request from the driving characteristics acquisition unit 420, the driving characteristics management server 300 provides the driving characteristics of each of the driver 1a of the vehicle 1 and the driver 2a of the vehicle 2 from the driving characteristics storage unit 310 to the driving assistance ECU 400. As a result, the driving characteristics acquisition unit 420 can acquire the driving characteristics of the drivers of the vehicles 1 and 2 that may collide with each other.

The driving action determination unit 430 determines the driving actions that allow the vehicles to avoid collision with each other in the driving situations acquired by the driving situation acquisition unit 410 and that match the driving characteristics acquired by the driving characteristics acquisition unit 420. For example, in FIG. 2, the driving action determination unit 430 determines the driving actions that allow the vehicles 1 and 2 to avoid collision in the driving situation, in which the vehicle 1 traveling on the feeder road and the vehicle 2 traveling on the main road may collide at the intersection 50, by taking into account the driving characteristics of the drivers of the vehicles 1 and 2.

The driving action instruction unit 440 instructs each of the vehicles, which may collide with each other, about a driving action determined by the driving action determination unit 430. For example, in FIG. 2, the driving action instruction unit 440 instructs the driver 1a, via the notification device of the vehicle 1, about the driving action determined by taking into consideration the driving characteristics of the driver 1a of the vehicle 1. On the other hand, the driving action instruction unit 440 instructs the driver 2a, via the wireless communication line and the notification device of the vehicle 2, about the driving action determined by taking into consideration the driving characteristics of the driver 2a of the vehicle 2. Thus, before the vehicles 1 and 2 enter the intersection 50, the drivers of the vehicles 1 and 2 can know the driving actions that match their own driving characteristics. As a result, the drivers of the vehicles 1 and 2 can avoid collision at the intersection 50 by driving their host vehicle according to the indicated driving action.

Since the driving actions determined by taking into consideration the driving characteristics of the drivers of the vehicles, which may collide with each other, are sent to the vehicles as described above, appropriate driving assistance can be provided to the vehicles.

Although the driving assistance device and the driving assistance method have been described by way of embodiments, the present disclosure is not limited to the above embodiments. Various modifications and improvements, such as a combination or substitution with some or all of other embodiments, are possible within the scope of the present disclosure.

For example, in FIG. 1, instead of the driving situation management server 200 predicting collision between vehicles, the driving assistance server 100 may predict collision between vehicles using the driving situations of the vehicles acquired from the driving situation management server 200.

What is claimed is:

1. A driving assistance device comprising:
   a driving situation acquisition unit that acquires driving situations of a first vehicle and a second vehicle;
   a driving characteristics acquisition unit that acquires driving characteristics of a first driver of the first vehicle and driving characteristics of a second driver of the second vehicle, the driving characteristics including a plurality of driving actions, each of the plurality of driving actions being assigned a driving characteristic score;
   a driving action determination unit that generates a plurality of combinations of driving actions of the first driver and driving actions of the second driver that allow the vehicles to avoid collision with each other in the driving situation acquired by the driving situation acquisition unit and selects a combination of a first driving action of the first driver and a second driving action of the second driver among the plurality of combinations based on driving characteristic scores for the first driving action and the second driving action acquired by the driving characteristics acquisition unit; and
   a driving action instruction unit that instructs the first vehicle and the second vehicle to perform the first driving action and the second driving action determined by the driving action determination unit.

2. The driving assistance device according to claim 1, wherein
the driving action determination unit is arranged remotely from a vehicle.

3. The driving assistance device according to claim 1, wherein
the driving action determination unit is mounted on a vehicle.

4. A driving assistance method comprising:
acquiring driving situations of a first vehicle and a second vehicle;
acquiring driving characteristics of a first driver of the first vehicle and driving characteristics of a second driver of the second vehicle, the driving characteristics including a plurality of driving actions, each of the plurality of driving actions being assigned a driving characteristic score;
generating a plurality of combinations of driving actions of the first driver and driving actions of the second driver that allow the vehicles to avoid collision with each other in the acquired driving situation;
selecting a combination of a first driving action of the first driver and a second driving action of the second driver among the plurality of combinations based on driving characteristic scores for the first driving action and the second driving; and
instructing the first vehicle and the second vehicle to perform the first driving action and the second driving action.

5. A vehicle comprising:
a driving assistance device comprising an electronic control device configured to:
acquire first information about driving situations of the vehicle and another vehicle;
acquire second information about driving characteristics of a driver of the vehicle and driving characteristics of another driver of the another vehicle, the driving characteristics including a plurality of driving actions, each of the plurality of driving actions being assigned a driving characteristic score;
generate a plurality of combinations of driving actions of the driver and driving actions of the another driver that allow the vehicle and another vehicle to avoid collision with each other in the acquired driving situation;
select a combination of a first driving action of the driver and a second driving action of the another driver among the plurality of combinations based on driving characteristic scores for the first driving action and the second driving action; and
send instructions to perform the first driving action to the vehicle and send instructions to perform the second driving action to the another vehicle.

* * * * *

UNITED STATES PATENT AND TRADEMARK OFFICE
CERTIFICATE OF CORRECTION

PATENT NO. : 10,353,394 B2
APPLICATION NO. : 15/671852
DATED : July 16, 2019
INVENTOR(S) : Hiroaki Takada et al.

Page 1 of 1

It is certified that error appears in the above-identified patent and that said Letters Patent is hereby corrected as shown below:

On the Title Page

Item (56), references cited, U.S. patent documents, delete "9,663,003 B2 * 5/2017 Bharwani ............... G08G 1/164"

Signed and Sealed this
Seventeenth Day of September, 2019

Andrei Iancu
*Director of the United States Patent and Trademark Office*